US010030623B2

(12) United States Patent
Perier (10) Patent No.: US 10,030,623 B2
(45) Date of Patent: Jul. 24, 2018

(54) METHOD AND SYSTEM FOR IMPROVING THE EFFICIENCY OF 2-WHEELED AND 3-WHEELED MOTOR VEHICLES

(71) Applicant: STMicroelectronics International N.V., Schiphol (NL)

(72) Inventor: Laurent Perier, New Delhi (IN)

(73) Assignee: STMICROELECTRONICS INTERNATIONAL N.V., Schiphol (NL)

( * ) Notice: Subject to any disclaimer, the term of this patent is extended or adjusted under 35 U.S.C. 154(b) by 195 days.

(21) Appl. No.: 14/670,998

(22) Filed: Mar. 27, 2015

(65) Prior Publication Data

US 2016/0177906 A1 Jun. 23, 2016

Related U.S. Application Data

(60) Provisional application No. 62/096,399, filed on Dec. 23, 2014.

(51) Int. Cl.
| | |
|---|---|
| *F02N 11/00* | (2006.01) |
| *F02B 63/04* | (2006.01) |
| *F02N 11/04* | (2006.01) |
| *H02P 9/00* | (2006.01) |
| *H02K 11/04* | (2016.01) |
| *F02B 61/02* | (2006.01) |
| *F02N 11/08* | (2006.01) |
| *H02P 9/48* | (2006.01) |

(52) U.S. Cl.
CPC ............ *F02N 11/04* (2013.01); *H02K 11/048* (2013.01); *H02P 9/00* (2013.01); *F02B 61/02* (2013.01); *F02N 2011/0896* (2013.01); *F02N 2200/0801* (2013.01); *F02N 2200/101* (2013.01); *F02N 2200/102* (2013.01); *F02N 2200/103* (2013.01); *H02P 9/48* (2013.01)

(58) Field of Classification Search
CPC .... F02B 63/04; F02D 2400/14; F02D 41/062; F02D 41/20; F02D 2041/2051; F02D 2041/2075; F02D 41/042; F02N 11/08; F02N 11/0818; F02N 11/0822; F02N 15/067; F02N 11/103; H02K 21/225
USPC .......................... 123/179.1, 179.3, 679–696
See application file for complete search history.

(56) References Cited

U.S. PATENT DOCUMENTS

| | | | | |
|---|---|---|---|---|
| 2,205,561 | A  * | 6/1940 | Holthouse ................. | F02P 1/04 123/149 R |
| 6,049,194 | A  * | 4/2000 | Nakagawa ............ | H02J 7/1484 322/20 |
| 6,278,194 | B1 * | 8/2001 | Nakagawa .............. | F02N 11/04 290/31 |
| 6,534,958 | B1 * | 3/2003 | Graber .................... | F02B 63/04 123/2 |
| 7,081,738 | B2 * | 7/2006 | Muramatsu ....... | H02M 7/53871 322/24 |

(Continued)

*Primary Examiner* — Long T Tran
(74) *Attorney, Agent, or Firm* — Seed IP Law Group LLP (57) ABSTRACT

A method and system of improving the efficiency of 2-wheeled and 3-wheeled motor vehicles includes stopping an engine of a motor vehicle system if the motor vehicle system is immobile for more than a predetermined period of time, according to one embodiment. The method and system includes starting the engine with a magneto system, in response to one or more vehicle conditions, such as operation of a throttle, operation of a clutch, and/or operation of a brake lever, according to one embodiment.

20 Claims, 4 Drawing Sheets

(56) References Cited

U.S. PATENT DOCUMENTS

| | | | | | |
|---|---|---|---|---|---|
| 7,157,885 | B2 * | 1/2007 | Nakagawa | ................ | H02P 9/04 290/52 |
| 7,311,084 | B2 * | 12/2007 | Begg | ....................... | F02D 41/34 123/476 |
| 8,979,603 | B1 * | 3/2015 | Rioux | ................. | B63H 21/386 440/75 |
| 2004/0012354 | A1 * | 1/2004 | Krefta | .................... | F02N 11/00 318/400.41 |
| 2005/0093520 | A1 * | 5/2005 | Muramatsu | ....... | H02M 7/53871 322/29 |
| 2008/0278120 | A1 * | 11/2008 | Sato | ...................... | H02J 7/1446 322/28 |
| 2008/0289604 | A1 * | 11/2008 | Joseph | ................. | F02D 35/023 123/406.51 |
| 2008/0296910 | A1 * | 12/2008 | Sato | ......................... | H02P 9/04 290/40 R |
| 2009/0020092 | A1 * | 1/2009 | Kishibata | ............. | F02D 41/062 123/179.3 |
| 2013/0269644 | A1 * | 10/2013 | Arai | ....................... | F02N 15/00 123/179.3 |

* cited by examiner

METHOD AND SYSTEM FOR IMPROVING THE EFFICIENCY OF 2-WHEELED AND 3-WHEELED MOTOR VEHICLES

BACKGROUND

Technical Field

The present disclosure generally relates to improving motor vehicle efficiency.

Description of the Related Art

In heavily populated cities throughout the world, 2-wheeled and 3-wheeled motor vehicles are in growing demand because they are affordable, easy to park in congested areas, obtain better fuel efficiency than cars, and are easily stored in/near homes with limited available storage. While advancements in technology trend towards lowering manufacturing costs for vehicles, the price of fossil fuels continues to become more expensive.

What is needed is an improvement on fuel efficiency for 2-wheeled and 3-wheeled motor vehicles.

BRIEF SUMMARY

The motor vehicle efficiency improvement techniques of the herein disclosed embodiments include stopping the engine of a 2-wheeled or 3-wheeled motor vehicle while the motor vehicle is not moving (e.g., while stopped at a traffic light), and starting the engine of the motor vehicle in response to receiving a signal from the driver (e.g., rotation of a handlebar throttle, release of the clutch, and/or release of a brake handle). Traditional 2-wheeled and 3-wheeled motor vehicles use a starter coil and a mechanical relay to start or turn-over a combustion engine. With repetitive use, mechanical relays tend to malfunction, e.g., "stick", and starter coils fail due to the large quantities of current that pass through the starter coil to start the combustion engine. Therefore, it is impractical to use a traditional starter coil and mechanical relay to stop and start a motor vehicle frequently, e.g., at traffic lights, to improve fuel efficiency, at least because the increased use of the starter coil and mechanical relay would cause the components to fail prematurely and would therefore reduce the overall reliability of the motor vehicle.

According to one embodiment, the traditional starter coil and mechanical relay system are replaced with one or more electronic components that enable the 2-wheeled and 3-wheeled motor vehicle engines to be started using a magneto system that already exists in 2-wheeled and 3-wheeled motor vehicles. According to one embodiment, the magneto system is configured as a generator to power the electronic loads of the motor vehicle (e.g., lights, electronic displays, radio, horn, etc.), and the magneto system is configured as a motor to start the combustion engine when it is time for the motor vehicle to begin moving.

Configuring existing magneto systems of 2-wheeled and 3-wheeled motor vehicles to enable a "smart" stop-start function or to enable an automated stop-start function in these motor vehicles provides several advantages. Advantages of stopping the engine when the motor vehicle is not in motion include, but are not limited to, reduced fuel consumption (i.e., increased fuel efficiency), reduced pollution, reduced wear on moving engine components, and therefore reduced operational costs of the motor vehicle. An advantage of replacing the function of a starter coil and relay system with a motor configuration of an engine's magneto system include, but are not limited to, less components (e.g., no starter, no relay) and lower manufacturing costs, according to one embodiment.

BRIEF DESCRIPTION OF THE SEVERAL VIEWS OF THE DRAWINGS

In the drawings, identical reference numbers identify similar elements or acts. The sizes and relative positions of elements in the drawings are not necessarily drawn to scale. Further, some figures are in schematic form and the particular shapes of some of the elements as drawn might not convey information regarding the actual shape of the particular elements and have been selected for ease of recognition in the drawings.

In the drawings, identical reference numbers identify similar elements or acts. The sizes and relative positions of elements in the drawings are not necessarily drawn to scale. For example, the shapes of various elements and angles, and some of the elements are enlarged and positioned to improve understanding of the inventive features.

DETAILED DESCRIPTION

In the description provided herewith, certain specific details are set forth in order to provide a thorough understanding of various disclosed embodiments. However, one skilled in the relevant art will recognize that embodiments may be practiced without one or more of these specific details, or with other methods, components, etc.

Unless the context requires otherwise, throughout the specification and claims that follow, the words "comprise" and "include" and variations thereof, such as "comprises," "comprising," and "including," are to be construed in an open, inclusive sense, that is, as meaning "including, but not limited to."

Reference throughout this specification to "one embodiment" or "an embodiment" means that a particular feature, structure or characteristic described in connection with the embodiment is included in at least one embodiment. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

As used in this specification and the appended claims, the singular forms "a," "an," and "the" include plural referents unless the content clearly dictates otherwise. It should also be noted that the term "or" is generally employed in its sense including "and/or" unless the content clearly dictates otherwise.

As used in the specification and appended claims, the use of "correspond," "corresponds," and "corresponding" is intended to describe a ratio of or a similarity between referenced objects. The use of "correspond" or one of its forms should not be construed to mean the exact shape or size.

Figure 1:
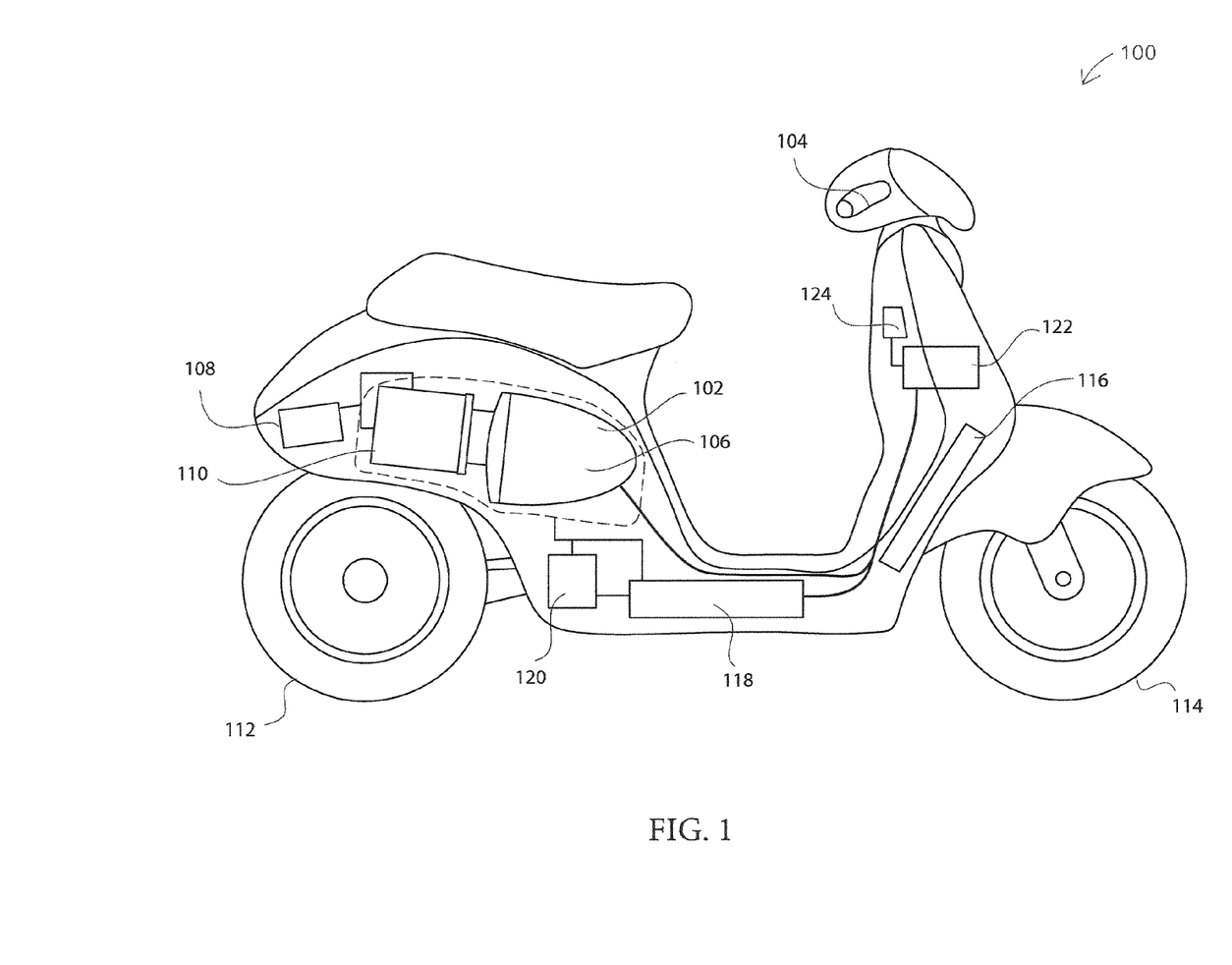
FIG. 1 is a simplified diagram illustrating a motor vehicle system configured with an automated engine start-stop feature, according to an embodiment of the invention.

FIG. 1 illustrates a motor vehicle system 100 that is configured to cease combustion engine operations if the motor vehicle system 100 becomes stationary, and that is configured to selectively start the combustion engine operations with a magneto system, in response to one or more rider operations or actions detected by the motor vehicle system 100, according to one embodiment. Examples of detectable rider operations or actions include, but are not limited to, operating a throttle, engaging/disengaging a clutch, engaging/disengaging a brake, and the like. The motor vehicle system 100 can include a 2-wheeled motor vehicle or a 3-wheeled motor vehicle, such as a scooter, a moped, a motorcycle, and the like. The motor vehicle system 100 includes an engine 102 that is configured to propel the motor vehicle system 100 in response to operation of a throttle 104 by a rider, according to one embodiment. The engine 102 includes a magneto system 106 that is configured as a motor for starting the engine 102 and that is configured as a generator for supplying power to various electrical loads/systems. The motor vehicle system 100 supplies fuel to the engine 102 from a fuel tank 108 and emits exhaust from the engine 102 through an exhaust pipe 110. The engine 102 is operably coupled to one or more rear wheels 112 and/or to one or more front wheels 114 to propel the motor vehicle system 100. The motor vehicle system 100 also includes a cooling system 116 (e.g., a radiator) for regulating the temperature of the engine 102, a battery 118, and a voltage converter 120 for powering the battery 118 and the magneto system 106. The motor vehicle system 100 further includes a controller 122 for monitoring the motor vehicle system 100 and for selectively starting and stopping the engine 102, to provide efficient operation of the motor vehicle system 100, according to one embodiment.

In practice, a user operates the motor vehicle system 100 by operating an ON/OFF switch 124, by releasing the brakes (e.g., lever brake(s) and/or floor break), by engaging a clutch, and/or by operating or manipulating the throttle 104. In response to the release of the brakes, engagement of a clutch, and/or the manipulation (e.g., twisting) of the throttle 104, the controller 122 enables the voltage converter 120 to convert a voltage from the battery 118 into signals for operating the magneto system 106 as a motor. The operation of the magneto system 106, as a motor, spins a rotor (e.g., that is coupled to a crankshaft) within the engine 102 and causes the engine 102 to begin running, according to one embodiment. The controller 122 causes the magneto system 106 to crank the engine 102 for a predetermined period of time, e.g., 3 seconds, or the controller 122 monitors the magneto system 106 to determine when the engine 102 has been successfully started.

Figure 2A:
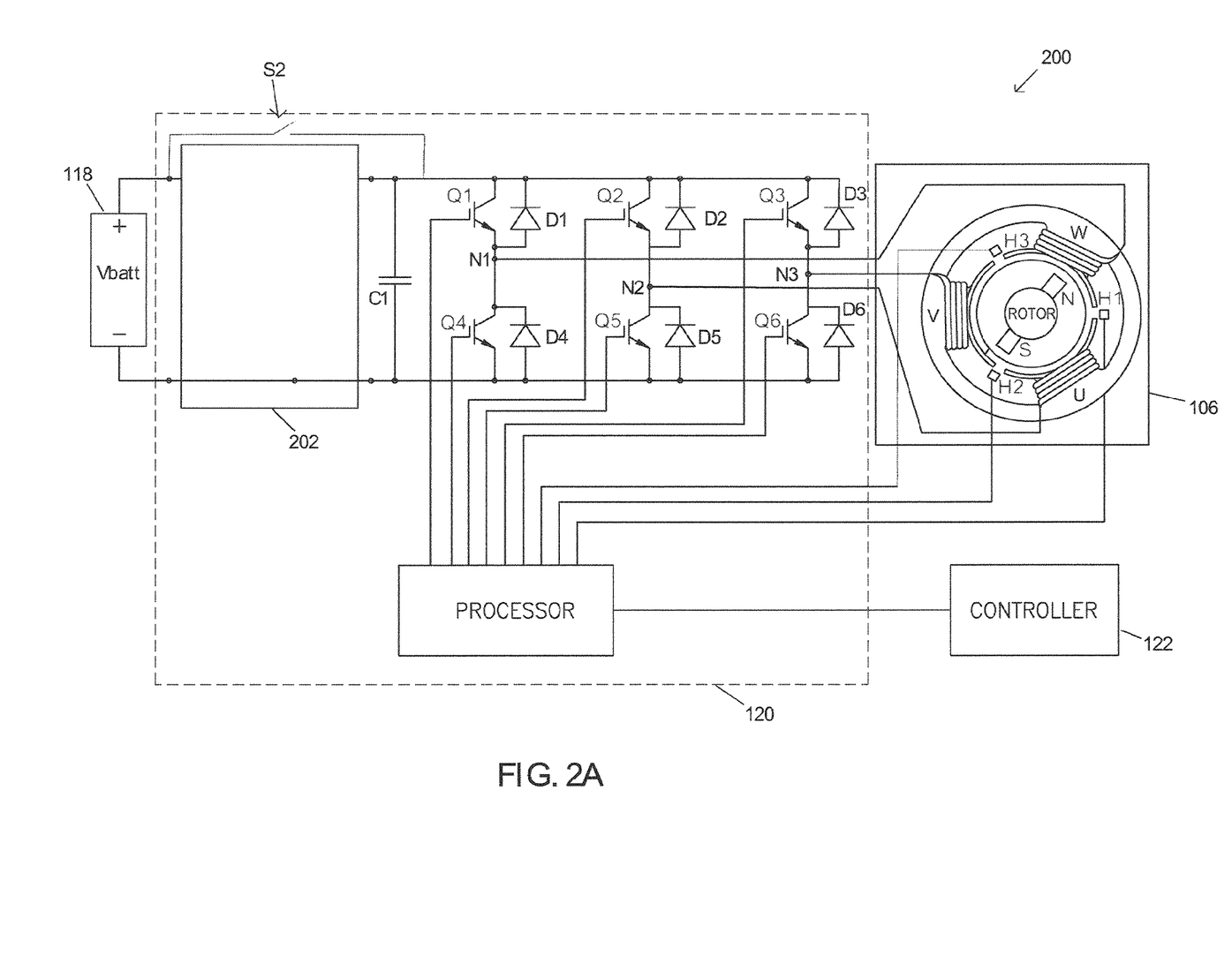
FIGS. 2A-2B are diagrams illustrating a configuration of the automated engine start-stop feature of FIG. 1, according to an embodiment of the invention.

FIG. 2A illustrates a motor-generator system 200 of the motor vehicle system 100, according to one embodiment. The motor-generator system 200 includes functional couplings between the magneto system 106, the voltage converter 120, and the controller 122. The magneto system 106 is a 3-phase DC motor-generator that includes inductive coils U, V, and W equidistantly positioned around a rotor. The rotor, as described above, is operably coupled to a crankshaft or other rotational mechanism within the engine 102 in order to operate the engine 102 or in order to be operated by the engine 102. The rotor carries a permanent magnet having a north magnetic pole N and a south magnetic pole S. The poles of the magnet generate voltages at nodes N1, N2, and N3 through the inductive coils U, V, and W, as defined by Faraday's law of induction. That is, a change in the magnetic environment of a coil of wire causes a voltage to be induced in the coil. Although a single magnet is illustrated, in other embodiments, multiple permanent magnets and/or multiple permanent magnet poles may be coupled to the rotor to induce voltage in the coils in generator mode (or to be electromagnetically displaced by the coils in motor mode).

The magneto system 106 also includes three optional magnetic field sensors, e.g., Hall Effect sensors, for determining the position of the rotor and for enabling the voltage converter to properly time the application of voltages to the inductive coils U, V, and W, in one embodiment. In other implementations, the position of the rotor is determined using current measurements (e.g., using Park modelisation) instead of using the magnetic field sensors, or by using other rotor position detection techniques.

The magneto system 106 can be implemented with a number of different configurations. For example, the magneto system 106 can include a single phase or can include three phases (as illustrated). In other implementations, the magneto system 106 includes one, two, or more Hall Effect sensors to detect the position of the rotor and the permanent magnet. Although a single north pole and a single south pole are illustrated, the magneto system 106 may employ two, three, four, or more magnetic poles to improve the smoothness of the operation of the magneto system 106. Additionally, while the permanent magnets are illustrated as being directly coupled or carried by a rotor, in other embodiments, a flywheel or plate is coupled to the rotor and one or more permanent magnets are carried by the flywheel or plate.

The voltage converter 120 is configured to charge the battery 118 while the magneto system 106 is operated as a generator, i.e., while the engine 102 is running and rotating the rotor. As the permanent magnet rotates past the inductive coils U, V, and W, one of the poles induces a positive voltage while the other of the polls induces a negative voltage at the nodes N1-N3. When the permanent magnets induce a negative voltage at a node, one of the lower diodes D4, D5, or D6 enables current to flow from ground and into the negative node. Additionally, when the permanent magnets concurrently induce a positive voltage at one of the other nodes, one or more of the upper diodes D1, D2, and D3 enable current to flow from the node, e.g., node N1, to the positive terminal of the battery 118. Depending upon the number of phases of the magneto and depending upon the revolutions per minute ("RPM") by which the engine is spinning the rotor, 100 cc-200 cc engines typically generate between 18-220 volts, 6-20 amps, and/or 78-260 watts. To protect the gates within the voltage converter 120, in some embodiments, the transistors Q1, Q2, Q3, Q4, Q5, and Q6 are implemented as integrated gate bipolar transistors ("IGBTs"). In other embodiments, the transistors Q1-Q6 are implemented using power MOSFETs ("metal oxide semiconductor field effect transistors"), which are generally less costly than IGBTs for low voltage applications.

The voltage converter 120 includes a voltage conditioner 202 between the transistors Q1-Q6 and the battery 118, to condition (e.g., reduce, increase, filter) the voltage generated by the magneto system 106, according to one embodiment. The voltage conditioner 202 can be implemented using a variety of topologies that include, but are not limited to, a buck converter, a boost converter, and a silicon-controlled rectifier, ("SCR") or thyrister, according to various embodiments.

The voltage converter 120 also includes a capacitor C1 coupled between a high voltage terminal and a ground terminal to reduce high-frequency rippling and to smooth the rectified voltages generated on nodes N1-N3 by the magneto system 106.

The voltage converter 120 selectively couples the battery 118 to the inductive coils U, V, and W to cause the permanent magnet(s) to rotationally displace the rotor, by generating positive and negative voltages on the inductive coils, according to one implementation. The voltage converter 120 includes transistors Q1-Q6 for selectively delivering voltage from the battery 118 through two inductive coils at a time, and the voltage converter 120 includes a switch S2 for selectively decoupling the battery 118 from the transistors Q1-Q6, according to one embodiment.

In one embodiment, the voltage converter 120 determines the position of the rotor by monitoring the magnetic field sensors H1-H3, and initiates a switching sequence to rotate the rotor based on the measurements acquired from the magnetic field sensors H1-H3. Because only one or two of the magnetic field sensors H1-H3 can be proximate to the north magnetic pole at a given instance, only 6 rotor positions or magnetic field sensor values are possible (e.g., if a 0 is assigned to sensors proximate to the south pole and a 1 is assigned to sensors proximate to the north pole), in one embodiment. Of course, other topologies and configurations of magnetic field sensors and permanent magnets can be used, in accordance with other embodiments.

Table 1 (shown below) includes an embodiment of a switching sequence to obtain clockwise rotation of a rotor from the magneto system 106.

TABLE 1

| Hall sensors values (H1, H2, H3) | state | U | V | W | Q1/Q4 | Q2/Q5 | Q3/Q6 |
|---|---|---|---|---|---|---|---|
| 110 | 3 | 0 | +V batt | −V batt | 1 | 2 | 6 |
| 100 | 1 | +V batt | 0 | −V batt | 1 | 5 | 6 |
| 101 | 5 | +V batt | −V batt | 0 | 1 | 5 | 3 |
| 001 | 4 | 0 | −V batt | +V batt | 4 | 5 | 3 |
| 011 | 6 | −V batt | 0 | +V batt | 4 | 2 | 3 |
| 010 | 2 | −V batt | +V batt | 0 | 4 | 2 | 6 | nb = ON switch

In response to receiving a command from the controller 122 to operate the magneto system 106 as a motor, the voltage converter 120 determines the Hall sensor values and applies the corresponding switch configuration (of Table 1), or applies the switch configuration of the subsequent Hall sensor value, to cause the rotor to rotate within the magneto system 106. The processor of the voltage converter 120 monitors the magnetic field sensors H1-H3 and switches the transistor configurations to apply voltages to different coils, as the rotor spins. When the voltage converter 120 receives an indication from the controller 122 that the engine 102 is operating (or that the engine 102 should be operating), the voltage converter 120 ceases to operate the magneto system 106 as a motor, according to one embodiment.

Figure 2B:
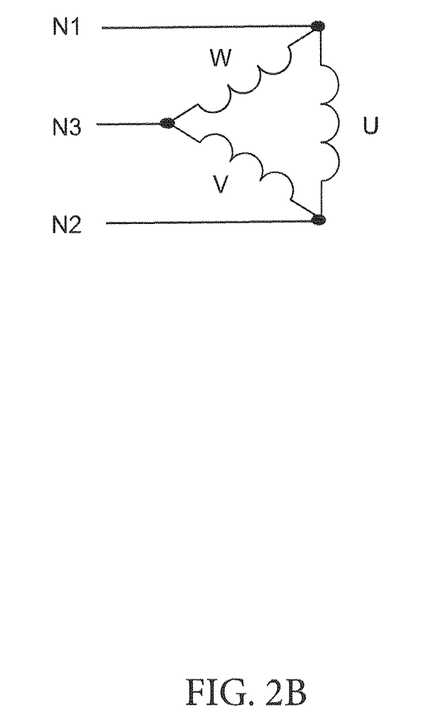

FIG. 2B illustrates a coil configuration 250 that is implemented in the magneto system 106 of the motor-generator system 200, according to one embodiment. Although a "Y" coil configuration is illustrated as corresponding to the magneto system 106, other coil configurations (e.g., delta coil configurations, four wire "Y" coil configurations) can be used with other configurations of magneto systems to operate the motor vehicle system 100, according to other embodiments.

Figure 3:
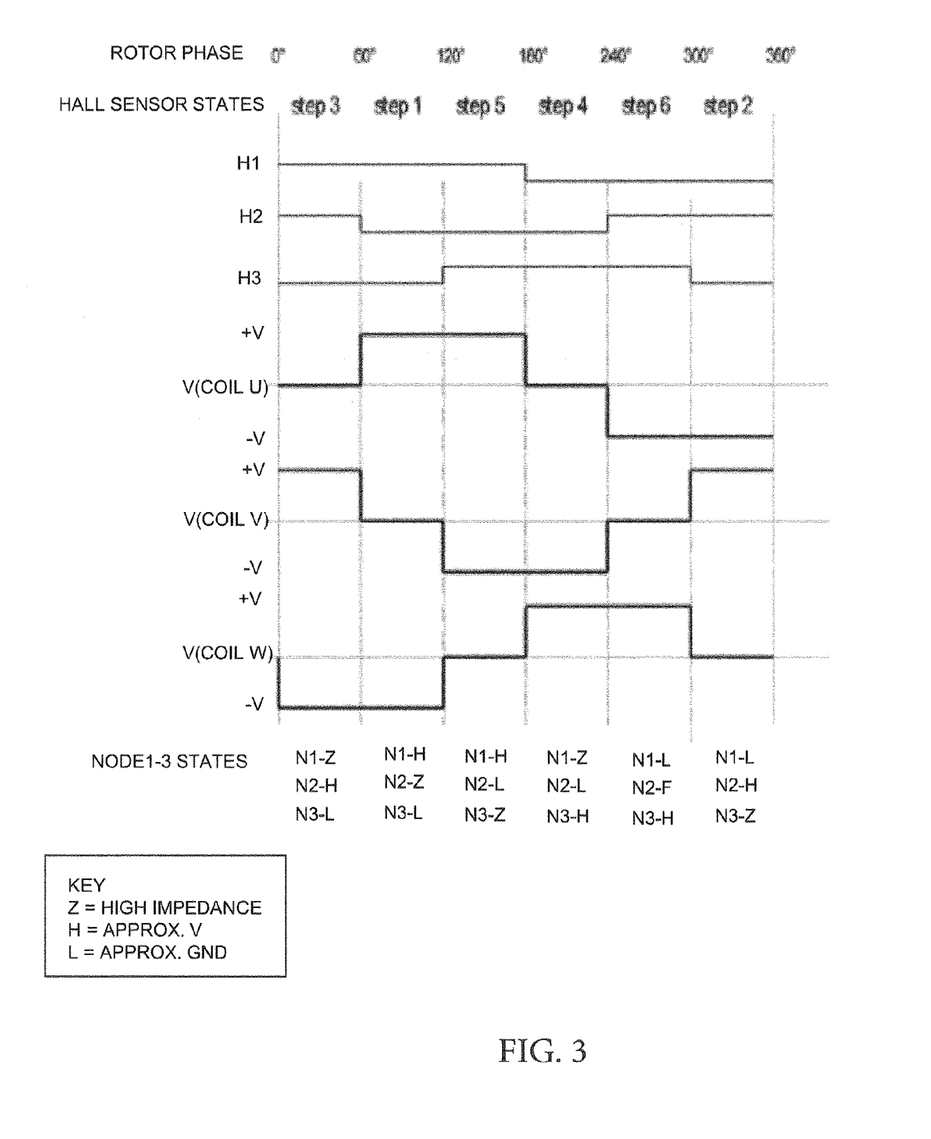
FIG. 3 illustrates a signal diagram of the operation the inductive coils of the motor vehicle system, according to one embodiment.

FIG. 3 illustrates an operational diagram 300 that shows the voltage level through each of the inductive coils U, V, and W for each magnetic field sensor state and for each node N1-N3 state (e.g., high impedance, high voltage, low voltage). The operational diagram 300 illustrates the rotor phase that corresponds with each of the combinations of magnetic field sensor states and inductive coil voltages, according to one embodiment.

According to some implementations, the pulses used to operate the transistors Q1-Q6 can be pulse width modulated (e.g., be comprised of a series of varying width pulses) to vary the intensity of magnetic field generated by each of the inductive coils U, V, and W, as will be understood by those of ordinary skill in the art.

In alternative implementations of the motor vehicle system 100, the magneto system 106 does not employ magnetic field sensors to facilitate determining the position of the rotor. Instead, the voltage converter 120 simply initiates a transistor sequence to induce a clockwise or counter clockwise rotating magnetic field within the magneto system 106, and the rotor eventually synchronizes with the magnetic fields.

The controller 122 transmits instructions to the voltage converter 120 to operate the magneto system 106 as a motor, in response to one or more conditions of the motor vehicle system 100, according to one embodiment. As described above, the controller 122 can be configured to cause the magneto system 106 to operate in motor mode if the engine 102 is off and one or more additional conditions occur, e.g., a rider or user operates the throttle 104, the ON/OFF switch 124 is in the ON position, a lever brake is released, a clutch is at least partially engaged, and a floor brake is released.

The controller 122 is also configured to stop the engine, in response to one or more conditions of the motor vehicle system 100, to increase the fuel efficiency of the motor vehicle system 100 and to decrease the pollution emitted by the motor vehicle system 100, according to one embodiment. The controller 122 can be configured to operate a relay, electrically overload the magneto system 106 while in generator mode, electrically open a distributor cable, or otherwise terminate normal operations of the engine 102. Examples of one or more conditions that may cause the controller 122 to stop the engine 102 include holding a brake level, detection of 0 mph (or kph) on the speedometer, detection of 0 mph on the speedometer for more than a predetermined period of time (e.g., 3-5 second), or the like.

FIG. 4 illustrates a flow diagram of a method 400 of improving fuel efficiency of a two-wheeled or three-wheeled motor vehicle system, according to one embodiment.

At block 402, the method includes stopping an engine of the motor vehicle system if the motor vehicle system is immobile for more than a predetermined period of time, according to one embodiment.

At block 404, the method includes starting the engine with a magneto system, in response to an operation of a throttle of the motor vehicle system by a user, according to one embodiment. Starting the engine with the magneto system can include selectively coupling a battery to one or more inductive coils in the magneto system and using two or more solid-state switches to apply torque to a rotor. The rotor is operably coupled to the engine.

The advantages of configuring the magneto system 106 as a motor-generator, include an ability to rapidly restart the engine, reliability of solid-state electronic components to operate the motor (rather than a mechanical relay), improved fuel consumption, less wear on moving parts in the engine, and less fossil-fuel by-product emissions, according to some embodiments.

The above description of illustrated embodiments is not intended to be exhaustive or to limit the embodiments to the precise forms disclosed. Although specific embodiments and examples are described herein for illustrative purposes, various equivalent modifications can be made without departing from the spirit and scope of the disclosure, as will be recognized by those skilled in the relevant art.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

I claim:

1. A two-wheeled or three-wheeled motor vehicle system, comprising:
    an engine having a rotor that rotates during a combustion cycle of the engine and a magneto system operably coupled to the rotor, the magneto system including one or more inductive coils and one or more permanent magnets;
    a voltage converter electrically coupled to the magneto system to receive voltage from the magneto system when the magneto system is driven by the engine, and to provide voltage to the magneto system to cause the magneto system to start the engine; and
    a controller communicatively coupled to the voltage converter and configured to cause the voltage converter to start the engine through a selective application of a battery voltage to the one or more inductive coils of the magneto system, in response to one or more motor vehicle system conditions.

2. The system of claim 1, further comprising a throttle, a clutch, and a break lever, wherein the one or more motor vehicle conditions include an operation of the throttle, an engagement of the clutch, and at least a partial release of the break lever.

3. The system of claim 1, wherein the controller is configured to terminate operation of the engine, in response to detection of a zero mile per hour or a zero kilometer per hour speed of the two-wheeled or three-wheeled motor vehicle system, and in response to detection of at least a partial engagement of a break lever.

4. The system of claim 1, wherein the one or more inductive coils include three inductive coils having a "Y" coil configuration.

5. The system of claim 1, wherein the engine is configured to rotate the rotor to generate at least one of at least 18 volts, at least 6 amps, and at least 78 watts.

6. The system of claim 5, wherein the engine is configured to rotate the rotor to generate at least one or between 18-220 volts, between 6-20 amps, and between 78-260 watts.

7. The system of claim 1, wherein the voltage converter includes at least 6 transistors configured as an H bridge to selectively apply the battery voltage to the one or more inductive coils to provide the voltage to the magneto system to cause the magneto system to start the engine.

8. The system of claim 7, wherein the at least 6 transistors include are power MOSFETs.

9. The system of claim 7, wherein the at least 6 transistors are integrated gate bipolar transistors.

10. The system of claim 7, wherein the voltage converter includes 6 diodes, wherein each of the 6 diodes is electrically coupled in parallel to a corresponding one of the at least 6 transistors, wherein the 6 diodes enable current to flow from ground through the magneto system and to the battery, when the engine rotates the rotor.

11. A method of improving fuel efficiency of a two-wheeled or three-wheeled motor vehicle system, comprising:
    stopping an engine of the motor vehicle system if the motor vehicle system is immobile for more than a predetermined period of time; and
    starting the engine with a magneto system included in the engine, in response to one or more motor vehicle system conditions,
    wherein starting the engine with the magneto system includes selectively applying a battery voltage to one or more inductive coils in the magneto system with two or more solid-state switches to apply torque to a rotor,
    wherein the rotor is operably coupled to the engine.

12. The method of claim 11, wherein the predetermined period of time is approximately 5 seconds.

13. The method of claim 11, wherein the one or more vehicle conditions include an operation of a throttle, an engagement of a clutch, and at least a partial release of a break lever.

14. The method of claim 11, wherein stopping the engine includes determining a speed of the two-wheeled or three-wheeled motor vehicle system, and stopping the engine in response to determining that the speed is a zero miles per hour or a zero kilometers per hour speed.

15. The method of claim 11, wherein the one or more inductive coils include three inductive coils having a delta coil configuration.

16. The method of claim 11, wherein the engine is configured to rotate the rotor to generate at least one of at least 18 volts, at least 6 amps, and at least 78 watts.

17. The method of claim 11, wherein selectively applying the battery voltage to the one or more inductive coils includes applying the battery voltage at least partially based on a switching sequence for the two or more solid-state switches.

18. A two-wheeled or three-wheeled motor vehicle system, comprising:
    an engine having a rotor that rotates during a combustion cycle of the engine, and
    a magneto system operably coupled to the rotor, the magneto system including one or more inductive coils and one or more permanent magnets;
    a voltage converter electrically coupled to the magneto system to receive voltage from the magneto system when the magneto system is driven by the engine, and to provide voltage to the magneto system to cause the magneto system to start the engine;
    a battery configured to provide a battery voltage;
    a switch configured to be operatively selected by a user of the motor vehicle system to start the engine; and
    a controller coupled to the switch and configured to cause the voltage converter to cause the magneto system to start the engine in response to user selection of the switch, the controller being configured to cause the voltage converter to cause the magneto system to start the engine by causing the voltage converter to selectively apply the battery voltage to the one or more inductive coils of the magneto system.

19. The system of claim 18, wherein the voltage converter includes at least 6 transistors configured as an H bridge to selectively apply the battery voltage to the one or more inductive coils to provide the voltage to the magneto system to cause the magneto system to start the engine.

20. The system of claim 19, wherein the voltage converter includes 6 diodes, wherein each of the 6 diodes is electrically coupled in parallel to a corresponding one of the at least 6 transistors, wherein the 6 diodes enable current to flow from ground through the magneto system and to the battery, when the engine rotates the rotor.

* * * * *